United States Patent
McClure et al.

(10) Patent No.: US 7,178,146 B1
(45) Date of Patent: Feb. 13, 2007

(54) PIZZA SCHEDULER

(75) Inventors: Steven T. McClure, Northboro, MA (US); Steven R. Chalmer, Weston, MA (US); Brett D. Niver, Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 858 days.

(21) Appl. No.: 10/106,337

(22) Filed: Mar. 26, 2002

(51) Int. Cl.
*G06F 9/44* (2006.01)

(52) U.S. Cl. .................................... 718/102

(58) Field of Classification Search ........ 718/100–108, 718/1
See application file for complete search history.

(56) References Cited

U.S. PATENT DOCUMENTS

| | | | | |
|---|---|---|---|---|
| 3,648,253 A * | 3/1972 | Mullery et al. | ............. | 718/100 |
| 4,989,133 A * | 1/1991 | May et al. | ............. | 718/102 |
| 5,247,677 A * | 9/1993 | Welland et al. | ............. | 718/103 |
| 5,287,508 A * | 2/1994 | Hejna et al. | ............. | 718/102 |
| 5,437,032 A * | 7/1995 | Wolf et al. | ............. | 718/103 |
| 5,517,643 A * | 5/1996 | Davy | ............. | 718/105 |
| 5,745,759 A | 4/1998 | Hayden et al. | | |
| 5,974,438 A * | 10/1999 | Neufeld | ............. | 718/104 |
| 6,067,557 A * | 5/2000 | Hegde | ............. | 718/103 |
| 6,108,683 A * | 8/2000 | Kamada et al. | ............. | 718/103 |
| 6,108,741 A * | 8/2000 | MacLaren et al. | ............. | 710/314 |
| 6,341,303 B1 * | 1/2002 | Rhee et al. | ............. | 718/104 |
| 6,397,262 B1 | 5/2002 | Hayden et al. | | |
| 6,434,708 B1 * | 8/2002 | Dunnihoo et al. | ............. | 713/502 |
| 6,560,628 B1 * | 5/2003 | Murata | ............. | 718/103 |
| 6,668,269 B1 * | 12/2003 | Kamada et al. | ............. | 718/103 |
| 6,675,190 B1 * | 1/2004 | Schabernack et al. | ...... | 718/102 |
| 6,697,876 B1 | 2/2004 | van der Veen et al. | | |
| 6,714,960 B1 * | 3/2004 | Bitar et al. | ............. | 718/103 |
| 6,785,889 B1 * | 8/2004 | Williams | ............. | 718/104 |
| 6,792,445 B1 * | 9/2004 | Jones et al. | ............. | 718/107 |
| 6,795,797 B2 * | 9/2004 | Lee et al. | ............. | 702/186 |
| 2002/0174164 A1 * | 11/2002 | Hayashi | ............. | 709/102 |
| 2003/0172104 A1 * | 9/2003 | Hooman et al. | ............. | 709/103 |
| 2004/0064817 A1 * | 4/2004 | Shibayama et al. | ......... | 718/104 |
| 2004/0244005 A1 * | 12/2004 | Ancier | ............. | 718/103 |
| 2005/0071547 A1 * | 3/2005 | Lin | ............. | 711/112 |

* cited by examiner

*Primary Examiner*—Lewis A. Bullock, Jr.
(74) *Attorney, Agent, or Firm*—Muirhead and Saturnelli, LLC

(57) ABSTRACT

Described are techniques used in task scheduling to form a run list used by a task scheduler. A non-priority based technique is disclosed in which each task to be executed is allotted a "pie" count representing the number of times out of the total run list each task is considered for scheduling. The total run list is the sum of all the "pie" counts for all tasks. Each time a task starts, exits, or has its pie count reset, the total number of "pie" counts is computed and tasks are distributed throughout the run list. Each task is distributed in the run list in accordance with its number of "pie" counts such that a minimum number of intervening tasks appears between each successive appearance of the same task. The computed run list is then used by the scheduler. The task scheduling techniques disclosed may be used in a data storage system or elsewhere in a computer system.

18 Claims, 7 Drawing Sheets

PIZZA SCHEDULER

BACKGROUND

1. Technical Field

This application generally relates to computer systems, and more particularly to scheduling tasks for execution in a computer system.

2. Description of Related Art

Computer systems may include an operating system providing for multi-tasking. Multi-tasking allows users to run multiple programs and gives the appearance that the computer system is executing all of the programs at the same time. The operating system performs multi-tasking by swapping tasks, processes, threads, and the like in and out of an execution or run state.

The operating system may schedule different tasks for execution in accordance with a variety of different criteria. For example, an operating system may schedule a new task for execution if a currently executing task is awaiting completion of a slow I/O operation. A new task may also be scheduled for execution interrupting a current task if the new task has a higher scheduling priority, or if the current task has run a completed time quantum or preset amount.

Drawbacks may exist with the amount of scheduling latency in connection with selecting and scheduling tasks for execution. For example, in connection with a priority-based scheme, the task with the highest priority of all tasks may be selected for execution. As the number of tasks in a "waiting for execution" state increases, the management and selection of the highest priority task may increase. Additionally, an embodiment may further implement an additional policy, such as an age policy, and also schedule a task for execution in connection with how long a task has been in the system, or waiting to execute. Taking into account the various criteria may increase the amount of time in scheduling latency especially as the number of tasks increases in a multi-tasking environment.

It may be desirable and advantageous to utilize an efficient technique in connection with task scheduling which minimizes the scheduling latency. It may also be desirable for such techniques to be scaleable for use with small and larger number of tasks linearly with respect to the number of tasks.

SUMMARY OF THE INVENTION

In accordance with one aspect of the invention is a method executed in a computer system for determining a run list comprising: determining a count for each task to be executed; determining a total count representing a sum of all counts for all tasks to be included in said run list; and distributing each task within said run list at least one time in accordance with each task's weighting factor, said weighting factor being represented as a ratio of said each task's count with respect to the total count.

In accordance with another aspect of the invention is a computer program product for determining a run list comprising: machine executable code that determines a count for each task to be executed; machine executable code that determines a total count representing a sum of all counts for all tasks to be included in said run list; and machine executable code that distributes each task within said run list at least one time in accordance with each task's weighting factor, said weighting factor being represented as a ratio of said each task's count with respect to the total count.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
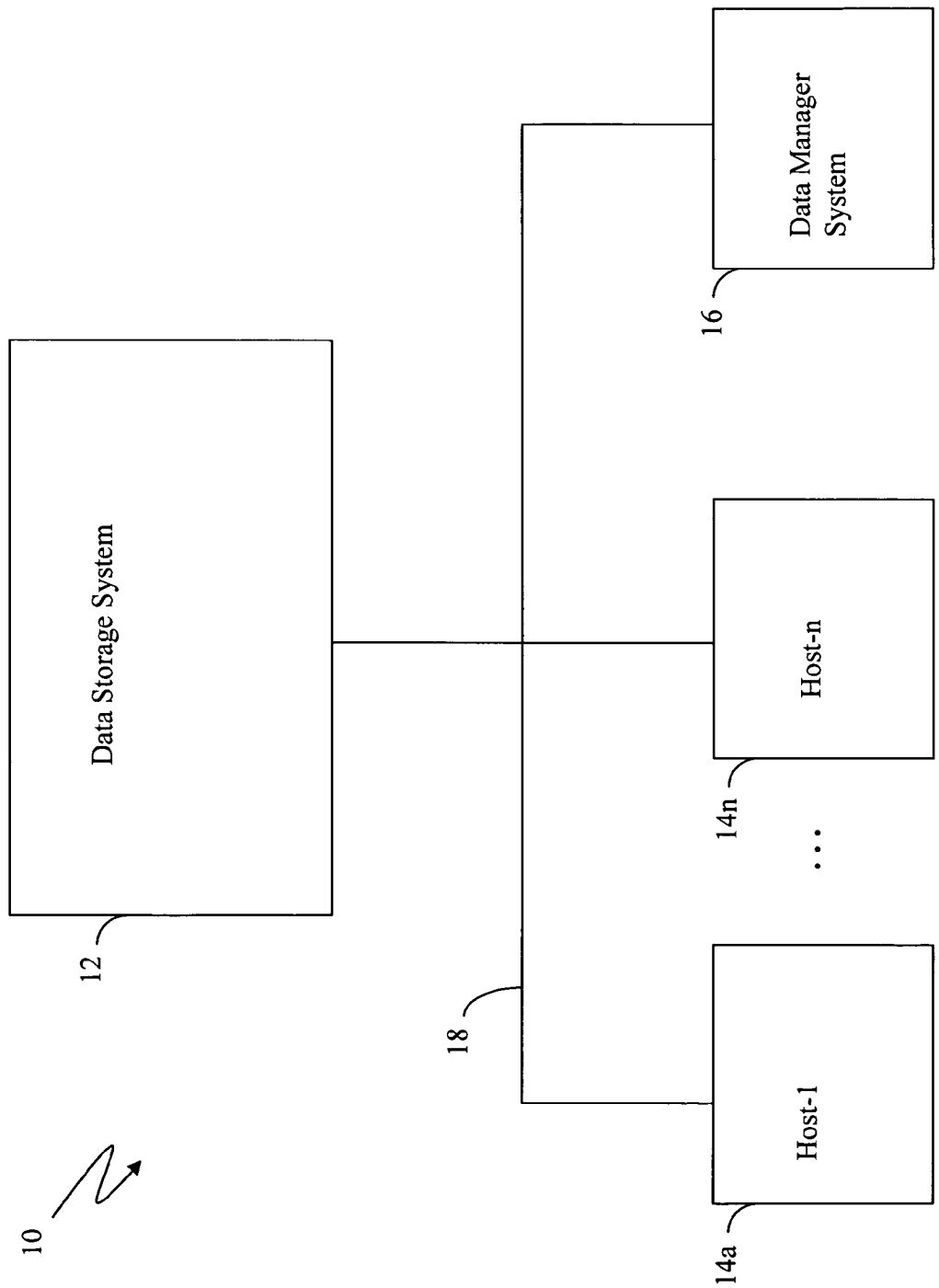
FIG. 1 is an example of an embodiment of a computer system according to the present invention.

Referring now to FIG. 1, shown is an example of an embodiment of a computer system according to the present invention. The computer system 10 includes a data storage system 12 connected to host systems 14a–14n, and a data manager system 16 through communication medium 18. In this embodiment of the computer system 10, the N hosts 14a–14n and the data manager system 16 may access the data storage system 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 14a–14n, and the data manager system may access and communicate with the data storage system 12, and may also communicate with others included in the computer system 10.

Each of the host systems 14a–14n, the data manager system 16, and the data storage system 12 included in the computer system 10 may be connected to the communication medium 18 by any one of a variety of connections as may be provided and supported in accordance with the type of communication medium 18. The processors included in the host computer systems 14a–14n and the data manager system 16 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a–14n and the data manager system 16, as well as those components that may be included in the data storage system 12 are described herein in more detail, and may vary with each particular embodiment. Each of the host computers 14a–14n, as well as the data manager system 16, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI (Small Computer System Interface), ESCON, Fibre Channel, or GIGE (Gigabit Ethernet), and the like. Some or all of the connections by which the hosts, data manager system 16 and data storage system 12 may be connected to the communication medium 18 may pass through other communication devices, such as a Connectrix or other switching equipment that may exist such as a phone line, a repeater, a multiplexer or even a satellite.

Each of the host computer systems as well as the data manager system may perform different types of data operations in accordance with different types of administrative tasks. In the embodiment of FIG. 1, any one of the host computers 14a–14n may issue a data request to the data storage system 12 to perform a data operation. For example, an application executing on one of the host computers 14a–14n may perform a backup, mirroring or other administrative operation and may do so while performing data requests to the data storage system 12.

Tasks executed on a host computer system may be scheduled for execution on a processor using software that may be included in, for example, an operating system of the host computer system. This task scheduling is described in more detail elsewhere herein.

Figure 2:
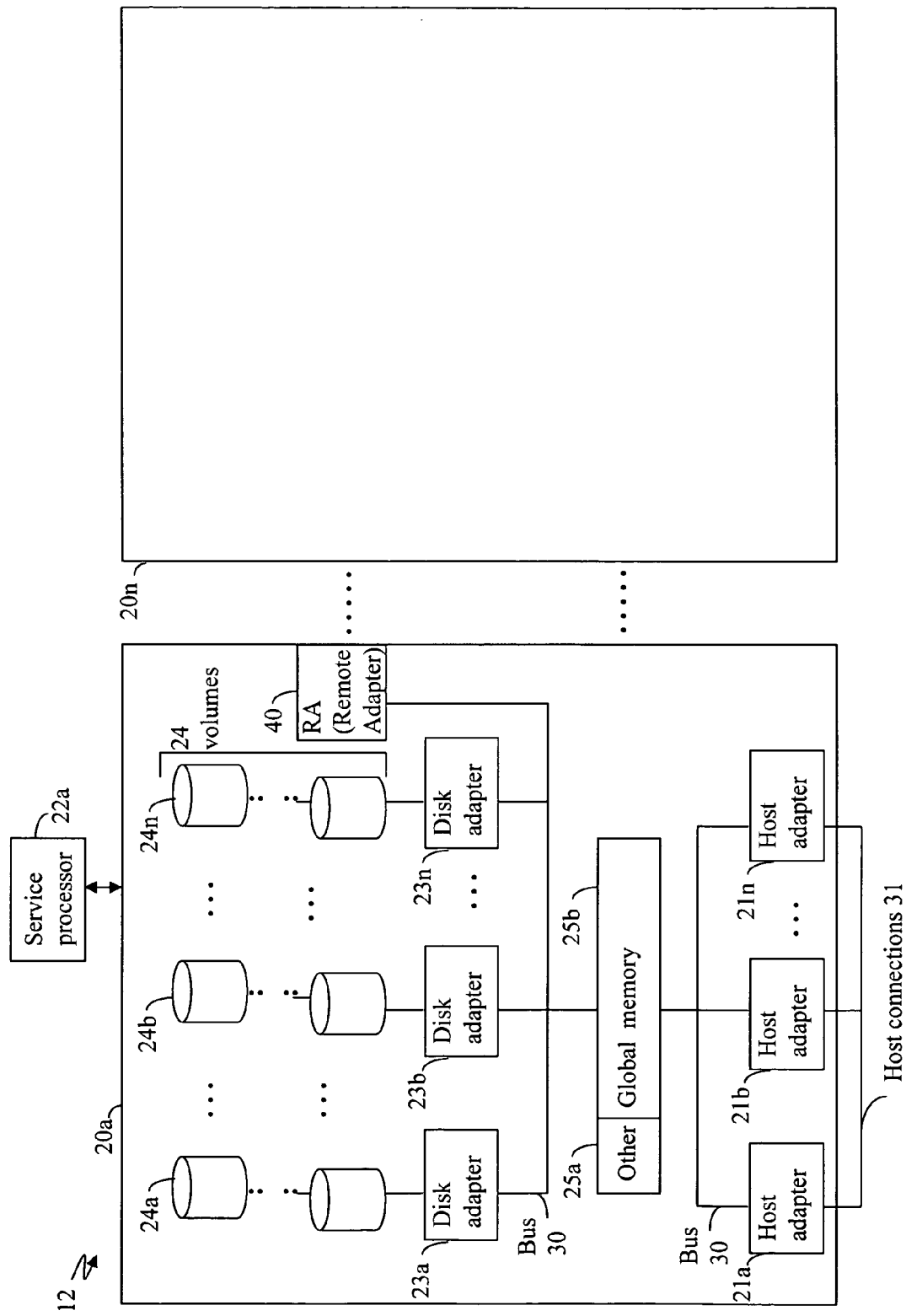
FIG. 2 is an example of an embodiment of a data storage system.

Referring now to FIG. 2, shown is an example of an embodiment of the data storage system 12 that may be included in the computer system 10 of FIG. 1. Included in the data storage system 12 of FIG. 2 are Symmetrix™ storage systems 20a–20n as manufactured by EMC Corporation of Hopkinton, Mass. In this particular example, each of the Symmetrix™ storage systems 20a–20n may be interconnected (not shown) as well as to the host and data manager systems through any one or more communication connections 30 that may vary with each particular embodiment and device in accordance with the different protocols used in a particular embodiment. Additionally, the type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include other types of data storage systems in combination with one or more Symmetrix™ systems. Each of 20a–20n may be resources included in an embodiment of the computer system 10 to provide storage services to, for example, host computer systems and/or the data manager system.

Each of the Symmetrix™ systems, such as 20a, may include a plurality of disk devices or volumes, such as the arrangement 24 consisting of n rows of disks or volumes 24a–24n. In this arrangement, each row of disks or volumes may be connected to a disk adapter ("DA") or director responsible for the backend management of operations to and from a portion of the disks or volumes 24. In the Symmetrix™ system 20a, a single DA, such as 23a, may be responsible for the management of a row of disks or volumes, such as row 24a. Each of the DAs 23a–23n are connected, for example, by a bus 30 to a cache that includes a particular portion designated as global memory 25b. The DAs 23a–23n may perform data operations to and from the cache that may be included in the global memory 25b, for example, in communications with other disk processors or directors, and other components of the system 20a. Generally, the global memory 25b may be used in facilitating communications between components in the system 20a. The other portion 25a is that portion of memory that may be used in connection with other designations that may vary in accordance with each embodiment.

An embodiment of the Symmetrix™ system 20a may include a service processor 22a used to manage and monitor the system 20a. In one embodiment, the service processor 22a may be used in collecting performance data, for example, regarding the I/O performance in connection with system 20a. This performance data may relate to, for example, performance measurements in connection with a data request as may be made from the different host computer systems 14a–14n. This performance data may be gathered and stored, for example, in the global memory and/or other storage area.

The system 20a may also include one or more host adapters ("HAs") or directors 21a–21n. Each of these HAs may be used to manage communications and data operations between one or more host systems and the global memory.

The particular data storage system as described in this embodiment, such as a Symmetrix™ system by EMC Corporation or a disk, should not be construed as a limitation. Other types of commercially available data storage systems, as well as processors and hardware controlling access to these particular devices, may be also be included in an embodiment.

Also shown in the storage system 20a is an RA or remote adapter 40. The RA may be hardware including a processor used to facilitate communication between data storage systems, such as between two Symmetrix data storage systems. The RA may be used with the Remote Data Facility (RDF) product provided by EMC Corporation of Hopkinton, Mass.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a Symmetrix data storage system and a host system. The RAs may be used in facilitating communications between two Symmetrix data storage systems. The DAs may be used in connection with facilitating communications to the associated disk drive(s) and LV(s) residing thereon.

The DA may cause I/O operations to be performed on a volume or device. In the following description, data may be accessed by LV in which a single DA manages data requests in connection with I/O operations in connection with multiple LVs that may reside on a disk. The DA may accomplish this by creating job records for the different LVs associated with the particular DA. These different job records may be associated with the different LVs in a data structure stored and managed by each DA.

Tasks executed by a processor of a host computer, or on a processor of any component included in the data storage system of FIG. 2 may be scheduled for execution by software. This software may be included, for example, within the operating system of the host computer system, or other software which schedules tasks for execution by a processor included in a component, such as a host adapter or disk adapter, of the data storage system.

Figure 3:
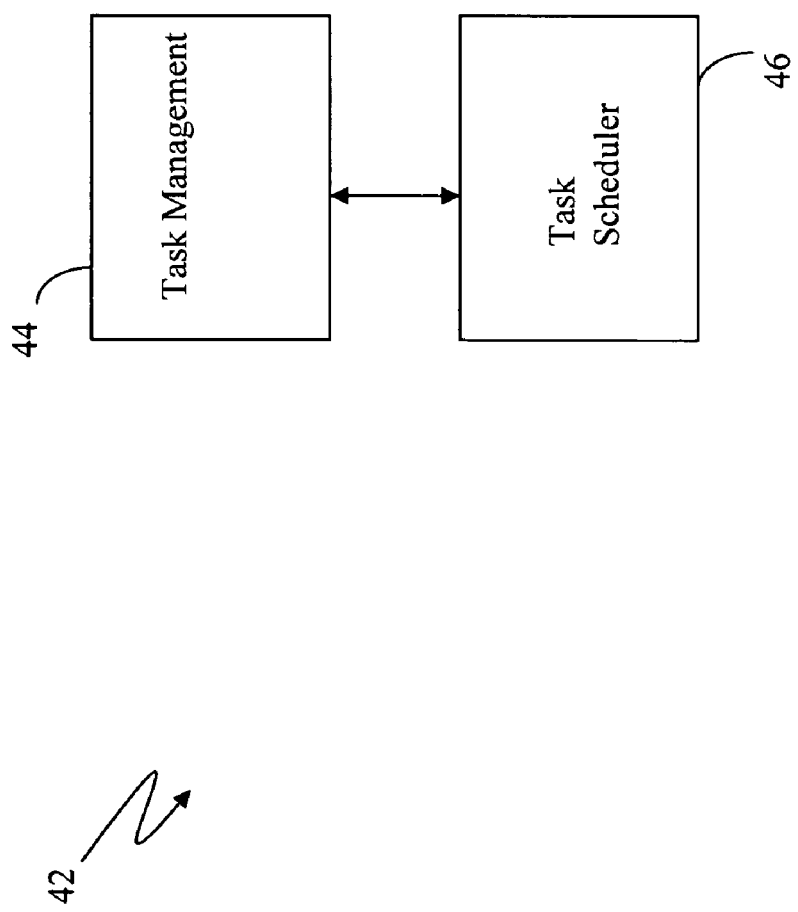
FIG. 3 is an example of an embodiment of software that may be included in a portion of the operating system for task management.

Referring now to FIG. 3, shown is an example of modules 42 that may be used in connection with task management. These modules may be included as part of operating system software. The task management module 44 may be characterized as performing functions in connection with creation of task objects or data structures and maintenance of these data structures. The task scheduler 46 may be characterized as performing functions in connection with scheduling a task for execution including, for example, performing context switches as needed to save and restore task state information. The task scheduler may perform scheduling of different user and/or operating system tasks in accordance with different scheduling policies and techniques that may vary in accordance with embodiment. One embodiment that is described in more detail in following paragraphs uses a non-priority based scheduling technique so that the scheduling process time remains relatively constant such that the time it takes to schedule any single task for execution for a predetermined time period is at worst linearly scaleable in accordance with the number of tasks.

A task may be in any one or more of a variety of different states that may vary in accordance with each embodiment. One of these states may be a "ready" state in which a task is ready for execution.

Figure 4:
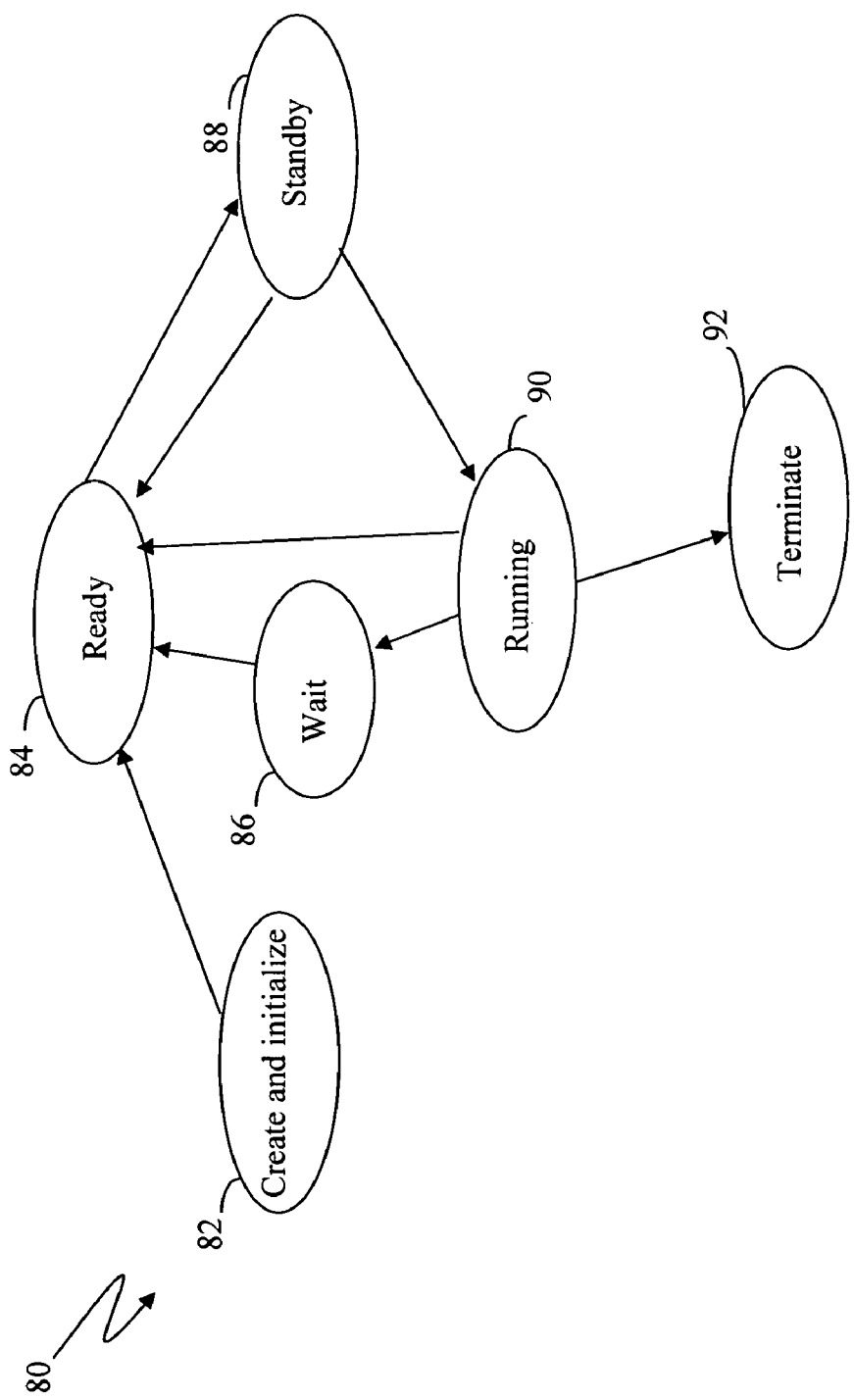
FIG. 4 is an example of a state transition diagram representing the different task states.

Referring now to FIG. 4, shown is a state diagram depicting different task states, including the "ready" task state. The state diagram 80 includes six states and indicates state transitions between these six states. At state 82, a task object or data structure is created and initialized. Subsequently, the task transitions to the ready state 84 ("ready for execution"), for example, by placing the newly created task object in an operating system ready queue or other data structure in accordance with each embodiment and operating system dependencies. One of the tasks in the ready state 84 may be selected for execution causing the task to transition to the standby state 88. In this representation of task states, only one task may be in the standby state for each processor. A task may transition to the standby state 88, for example, if it is pre-empted in connection with an interrupt. From the standby state 88, a task transitions to the running state 90 after a context switch is completed enabling the task to execute.

From the running state 90, a task may transition to the wait state 86, the ready state 84, or the terminate state 92. A task may transition to the wait state 86, for example, if the task is waiting for a resource to become available. A task may transition to the ready state 84 from the running state 90, for example, if a predetermined time period for execution has ended but the task is not done executing. A task may transition to the terminate state 92 upon completion. From the wait state 86 a task may transition to the ready state 84, for example, when a resource that the task is waiting for becomes available.

Tasks in the "ready" state 84 may be included in a data structure referred to as the run list of tasks scheduled for execution.

Figure 5:
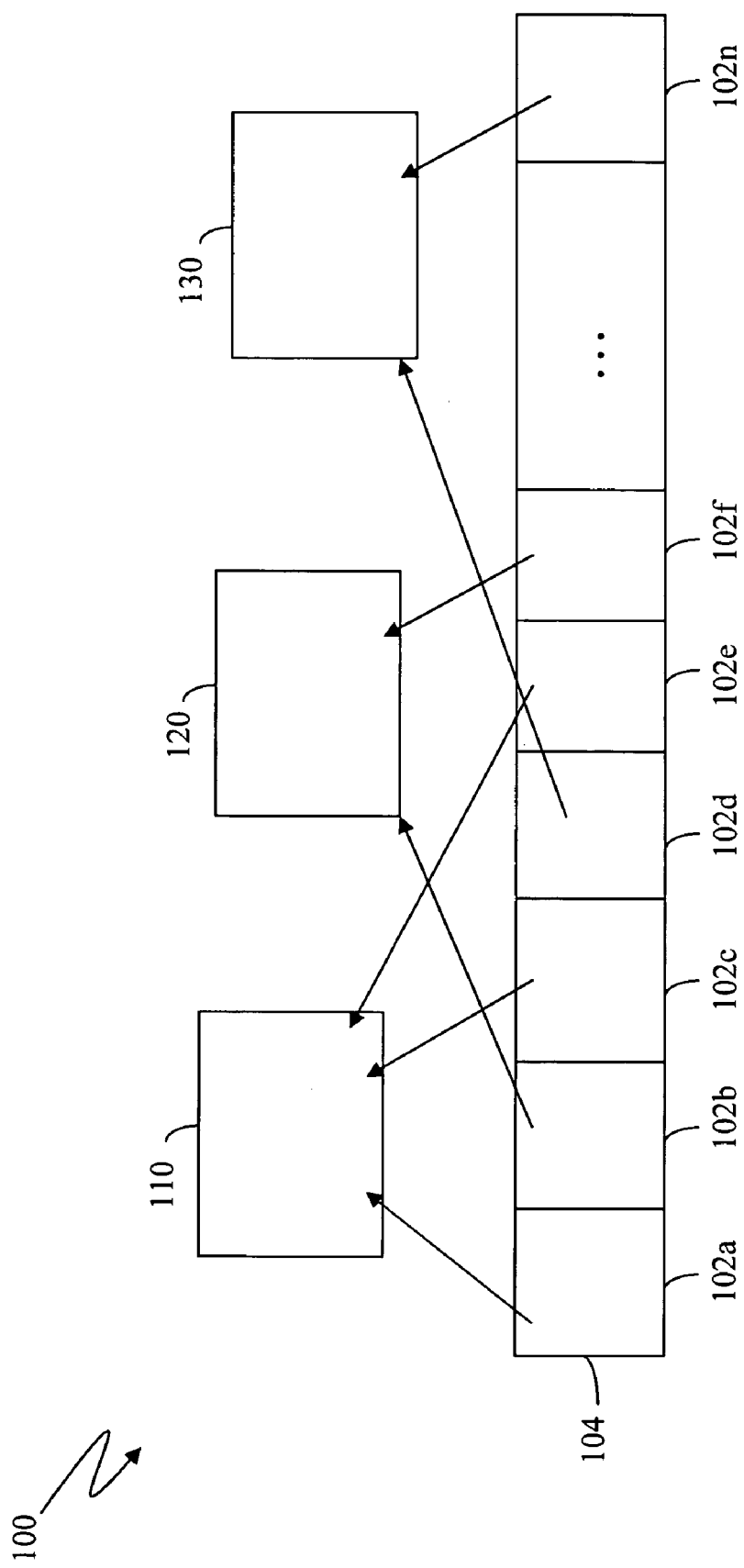
FIG. 5 is an example of an embodiment of a task scheduling list, or run list, of tasks in the "ready" state.

Referring now to FIG. 5, shown is an example of an embodiment 100 of a run list of tasks in a ready state. The list 104 in this example is list of entries 102a–102n. Each entry points to an associated task data structure or object, such as 110, 120, or 130. Each task structure may be created and initialized by the task management module described elsewhere herein. Each entry of the list 104 identifies a "slice" of time for the associated task to execute. The task scheduler may traverse the list 104 one entry at a time in scheduling tasks for execution. For example, task 110 associated with entry 102a may be executing. Upon task 110 of entry 102a completing execution for the predetermined time period, the task scheduler performs a context switch loading the context of task 120 associated with entry 102b for execution.

It should be noted that a particular task, such as 110, may be referenced by a plurality of entries. The number of entries referencing a particular task determines the number of times the particular referenced task is executed in proportion to other tasks referenced by other list entries.

The run list 104 may be determined by allotting a "pie count" to each task. The total "pie count" for all the tasks is represented by the number of entries in the run list 104. The number of entries in the list may be dynamic as the total number of slices may change, for example, when a task starts, completes, or has its pie count reset. In one embodiment, each time a task starts, completes or has its pie count reset, a routine may be called to compute the total number of slices and distribute tasks throughout the list forming the run list 104. The number of times each task is referenced by an entry in the list 104 is proportional to the tasks' pie count. The distribution of references to a task in the list 104 is such that a minimum number of intervening tasks may appear between each successive appearance of the same task in the list. In other words, the position of a task within the list with respect to another reference to the same task in the list is in accordance with the particular task's weighting factor. The task's weighting factor may be represented as the ratio of the task's pie count with respect to the total pie count.

In one example, if the pie count is one for each task, the number of entries in the list 104 is equal to the number of tasks in the system and tasks execute in a round-robin manner. In another example, setting a single task's pie count to 2 with all other tasks having a pie count of 1 results in a list having a number of entries equal to the number of tasks +1. The single task having the pie count of 2 may appear once at the start of the list and once again half way through the list. The foregoing are examples regarding the number of entries between successive references to the same task for scheduling in accordance with a task's weighting factor.

The resulting computed run list may be used by the scheduler in scheduling tasks for execution. The use of the foregoing run list may be used to minimize the latency for scheduling task in accordance with a non-priority based manner. The time to schedule any single task is linearly related to the run list size.

It should be noted that the list 104 may be implemented as a single or a doubly linked list. Other embodiments may use other data structures, such as an array. The tasks scheduled for execution using the foregoing techniques may include user tasks as well as other system tasks scheduled such that there is no priority scheme of tasks on the run list.

Figure 6:
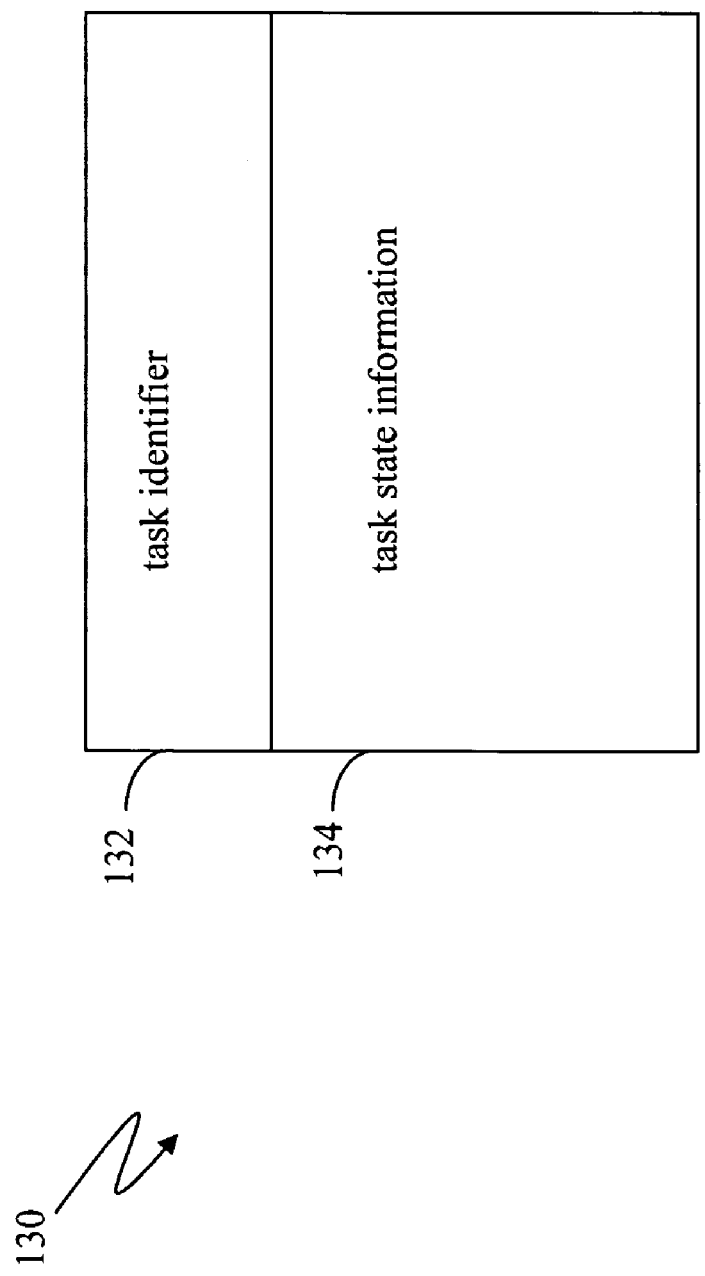
FIG. 6 is more detailed example of an embodiment of task data structure as shown in FIG. 5.

Referring now to FIG. 6, shown is a more detailed example of an embodiment of a task data structure or object 130. The task object 130 includes a task identifier field 132 and task state information 134. The task identifier field 132 includes a value that uniquely identifies the task within the operating system, for example. The task state information 134 may include task state information, such as contents of registers, stack and other processor state information necessary to execute the task 120 when task context switches are performed. Other embodiments may include other information within a data structure identifying a particular task.

Figure 7:
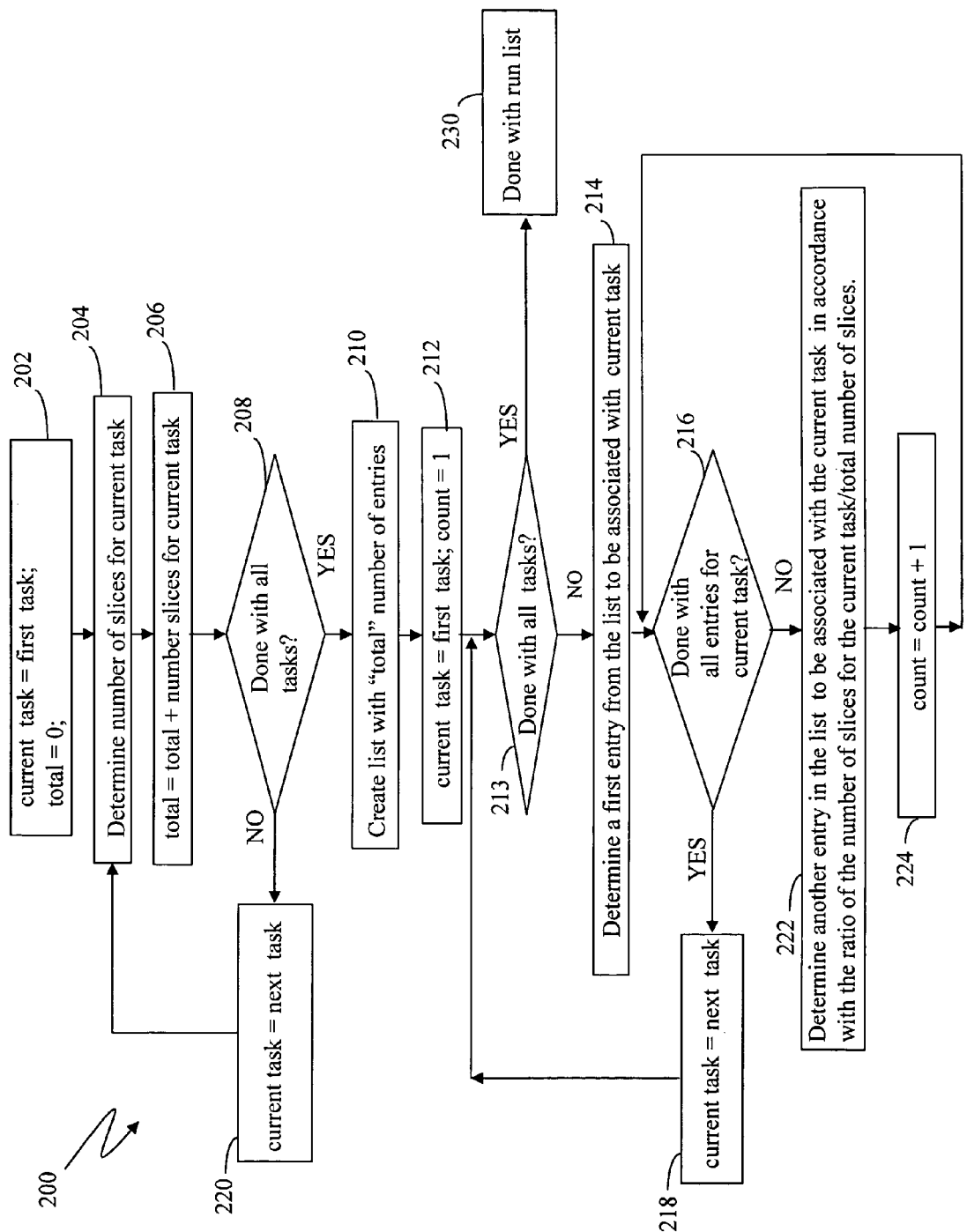
FIG. 7 is a flowchart of steps of an embodiment for determining a run list used by the task scheduler.

Referring now to FIG. 7, shown is a flowchart 200 of steps of an embodiment for scheduling tasks for execution. The steps of the flowchart 200 may be performed by the task scheduler described elsewhere herein. At step 202, the current task is initialized as the first task, and the variable total is assigned the value 0. Control proceeds to step 204 where a number of slices for the current task is determined. At step 206, total is updated to include the number of additional slices for the current task. Control proceeds to step 208 where a determination is made as to whether all tasks have been processed. If not, control proceeds to step 220 where the current task is assigned the next task to be processed. If, at step 208, a determination is made that all tasks have been processed, control proceeds to step 210 where a run list containing "total" entries is created. Current task is initialized to the first task, and count is initialized to 1 at step 212.

At step 213, a determination is made as to whether all tasks have been processed. If so, control proceeds to step 230 where the process of building the run list is complete and the task scheduler may begin executing a task using the run list. Otherwise, if all tasks have not been processed, control proceeds to step 214 to begin processing the current task.

At step 214, a first entry in the run list is selected to be associated with the current task. This first entry may be determined using any one of a variety of techniques and/or heuristics. For example, the first entry associated with the current task may be determined randomly, or as the first free entry in the list. At step 216, a determination is made as to whether all entries for the current task have been initialized. This may be determined by comparing count to the number of slices associated with the current task. If all entries in the list for the current task have been initialized and associated with the current task, control proceeds to step 218 where the current task is assigned the next task to be processed. Control proceeds to step 213 where a determination is made as to whether all tasks have been processed.

If, at step 216, a determination is made that entry processing of the run list for the current task is not complete, control proceeds to step 222 where another entry in the run list is selected and associated with the current task. The entry selected at step 222 may be determined in accordance with a variety of different techniques. For example, the weight of a particular task may be represented as:

number of slices for task/total number of slices

If this ratio is 10/50=1/5, then the next entry selected at step 222 may be 5 entries away from the previously selected entry, assuming this entry is free. Otherwise, the next successive entry may be selected. At step 224, count is incremented by 1. This process may be repeated for the current task until 10 entries have been selected and associated with the current task. The foregoing is one technique that may be used such that the ratio represents an approximate distribution of the current task with respect to a portion of consecutive entries in the run list. Following step 224, control proceeds to step 216.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for causing a processor to execute a plurality of tasks, comprising:
   determining a count for each task to be executed;
   determining a total count representing a sum of all counts for all tasks to be included in said run list;
   constructing the run list by distributing corresponding entries for each task within said run list a number of times in accordance with each task's weighting factor, said weighting factor being represented as a ratio of said each task's count with respect to the total count, wherein at least one of said tasks has more than one corresponding entry in said run list; and
   executing said tasks in said run list in a round-robin manner.

2. The method of claim 1, further comprising:
   determining a first position and a second successive position of a first task in said run list such that a minimum number of other tasks intervene between said first position and said second successive position.

3. The method of claim 2, further comprising:
   computing an updated total count value replacing said total count upon detection of at least one of: a task start, a task completion and a reset of a task's pie count.

4. The method of claim 3, further comprising:
   distributing, in response to said computing, each task throughout said run list in accordance with said each task's weighting factor using said updated total count value and said each task's pie count.

5. The method of claim 4, wherein said computing and said distributing in response to said computing are performed by invoking a routine.

6. The method of claim 5, wherein said run list is one of a single and a doubly linked list.

7. The method of claim 4, wherein said run list is used by a task scheduler included in a data storage system of said computer system.

8. The method of claim 1, wherein said count associated with each task in said run list is 1.

9. The method of claim 1, wherein said count associated with a first task in said run list is 2 and all other tasks in said run list have an associated count of 1, said first task appearing at a first position at the start of the run list and at a second position approximately half way through said run list.

10. A computer program product, provided in a computer-readable storage medium, for causing a processor to execute a plurality of tasks, comprising:
    machine executable code that determines a count for each task to be executed;
    machine executable code that determines a total count representing a sum of all counts for all tasks to be included in said run list; and
    machine executable code that constructs a run list by distributing corresponding entries for each task within said run list a number of times in accordance with each task's weighting factor, said weighting factor being represented as a ratio of said each task's count with respect to the total count, wherein at least one of said tasks has more than one corresponding entry in said run list; and
    executable code that causes each of said tasks in said run list to run in a round-robin manner.

11. The computer program product of claim 10, further comprising:
    machine executable code that determines a first position and a second successive position of a first task in said run list such that a minimum number of other tasks intervene between said first position and said second successive position.

12. The computer program product of claim 11, further comprising:
    machine executable code that computes an updated total count value replacing said total count upon detection of at least one of: a task start, a task completion and a reset of a task's pie count.

13. The computer program product of claim 12, further comprising:
    machine executable code that distributes, in response to said computing, each task throughout said run list in accordance with said each task's weighting factor using said updated total count value and said each task's pie count.

14. The computer program product of claim 13, wherein said machine executable code that computes and said machine executable code that, in response to said computing, distributes, are executed by invoking a routine.

15. The computer program product of claim 14, wherein said run list is one of a single and a doubly linked list.

16. The computer program product of claim 13, wherein said run list is used by a task scheduler included in a data storage system of said computer system.

17. The computer program product of claim 10, wherein said count associated with each task in said run list is 1.

18. The computer program product of claim 10, wherein said count associated with a first task in said run list is 2 and all other tasks in said run list have an associated count of 1, said first task appearing at a first position at the start of the run list and at a second position approximately half way through said run list.

* * * * *